(12) United States Patent
Hannigan et al.

(10) Patent No.: US 6,319,864 B1
(45) Date of Patent: Nov. 20, 2001

(54) TRIPLE LAYER, LAMINATED FABRIC WITH WATERPROOF, NON-BREATHABLE INNER LAYER

(75) Inventors: Ryan B. Hannigan, West Hartford, CT (US); Hussein A. Shehata, West Windsor, NJ (US)

(73) Assignee: RBH Designs, LLC, West Hartford, CT (US)

( * ) Notice: Subject to any disclaimer, the term of this patent is extended or adjusted under 35 U.S.C. 154(b) by 0 days.

(21) Appl. No.: 09/435,908

(22) Filed: Nov. 8, 1999

Related U.S. Application Data
(60) Provisional application No. 60/123,740, filed on Mar. 10, 1999.

(51) Int. Cl.$^7$ ............................ B32B 27/04; B32B 27/12; B32B 5/26
(52) U.S. Cl. ........................ 442/281; 442/268; 442/277; 442/286; 442/394
(58) Field of Search ..................... 442/246, 247, 442/250, 255, 261, 279, 293, 85, 268, 277, 281, 286, 394

(56) References Cited

U.S. PATENT DOCUMENTS

| | | | |
|---|---|---|---|
| 5,364,678 | * 11/1994 | Lumb et al. | 428/96 |
| 5,571,592 | * 11/1996 | McGregor et al. | 428/71 |
| 5,804,011 | * 9/1998 | Dutta et al. | 156/160 |
| 5,935,882 | * 8/1999 | Fujita et al. | 442/247 |

* cited by examiner

Primary Examiner—Terrel Morris
Assistant Examiner—Ula C. Ruddock
(74) Attorney, Agent, or Firm—M. P. Williams

(57) ABSTRACT

A fabric for garments to be used in cold temperatures or at high altitudes includes an inner layer comprising a thin, comfortable fabric having relatively poor moisture absorption, such as silk, nylon tricot, or polyester tricot, is laminated to a barrier layer comprising a hydrophobic, moisture and air impervious film such as polyethylene, which in turn is laminated to an insulating layer such as fleece or polyurethane fiberfill. The fabric is laminated using an adhesive comprising a mixture of acrylic and polyurethane with a cross linkage catalyst which reacts with active hydrogen groups in polyurethane, heated for about one minute between 180° F. and 220° F. to dry and cure the lamination.

11 Claims, 1 Drawing Sheet

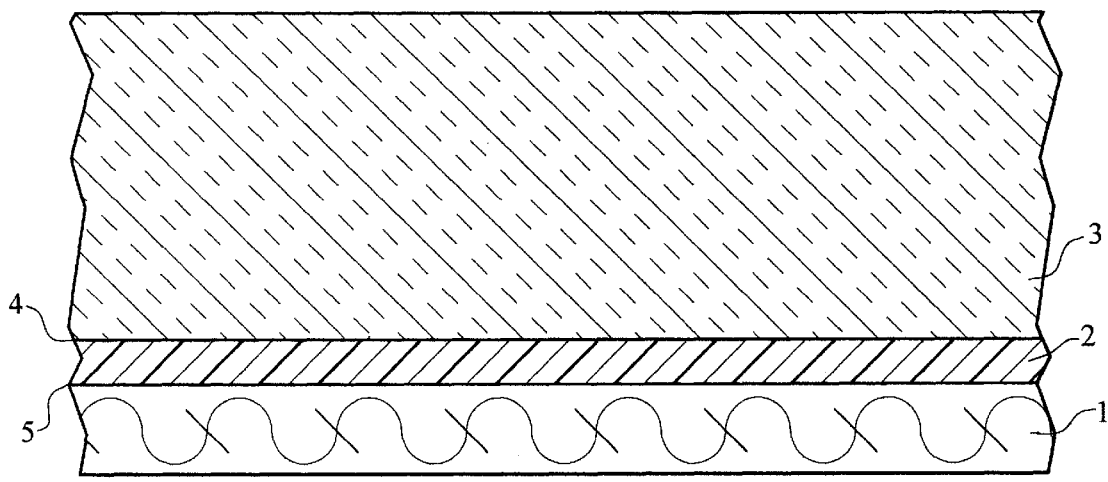

TRIPLE LAYER, LAMINATED FABRIC WITH WATERPROOF, NON-BREATHABLE INNER LAYER

This application claims the benefit of provisional application Ser. No. 60/123,740 filed on Mar. 10, 1999.

TECHNICAL FIELD

This invention relates to a triple layer, laminated fabric for clothing for cold weather and/or high altitude use, which has a thin lining fabric laminated to a waterproof, non-breathable plastic film which in turn is laminated to an insulating layer, such as fleece or polyfiberfill.

BACKGROUND ART

To keep feet warm and dry in cold weather, particularly in snow or slush, people have wrapped their feet with plastic film, including bread bags and common household food wrap, before putting on socks. However, this technique is not useful for the remainder of the body. In recent years, the emphasis for cold weather and/or high altitude clothing has been on "waterproof and breathable" laminates. Water vapor molecules, from perspiration, will transfer through such fabrics, such as by a process of absorption, diffusion and desorption or by evaporation. Water vapor from perspiration will pass out but liquid water will not pass in. In breathable garments, the moisture goes to the outer insulation and adulterates it. The wet outer insulation causes evaporative heat loss, which can be severe. Furthermore, these fabrics include a wicking base, for the intended purpose of attracting the perspiration moisture to lead it to the breathable layer. Garments made of such a fabric tend to mask the degree of perspiration which the wearer is creating, thus hiding the commencement of dehydration, which can lead to high altitude sickness, including cerebral and/or pulmonary edema. Fabrics of this type are disclosed in the following U.S. Pat. Nos.: 4,194,041, 4,845,862, 4,898,761, 5,126,182, 5,204,156, 5,268,212, 5,364,678, and 5,435,014.

In U.S. Pat. No. 4,502,153 there is disclosed a garment liner having a vapor barrier adjacent opposite surfaces of a layer of insulating material, to keep the insulating material dry.

Another known garment utilizes two layers of fleece having a breathable barrier layer in between. Because of the weight of the inner fleece lining, this garment will absorb significant perspiration, thereby masking the onset of dehydration, and the garment will not dry quickly between use, therefore remaining wet and cold. Since the inner fleece is wet, it provides no insulation whatsoever.

A shirt or vest having a layer of thin tricot laminated to a thin flexible polyurethane film has been found to be insufficiently durable, due to delamination of the film from the tricot, tearing of the film, and loss of patches of film from the tricot.

DISCLOSURE OF INVENTION

Objects of the invention include provision of a fabric for use in garments designed for cold temperatures and high altitudes which: reduces the risk of high altitude sickness through avoidance of dehydration and overheating by detection of body perspiration; provides warmth during many hours of continuous use, avoiding degradation of the insulation by preventing the insulation from becoming wet, or even damp, with perspiration; helps prevent frostbite by retaining body heat, including prevention of evaporative and convective heat loss and reduction of conductive heat loss; avoids discomfort from wetness; allows perspiration to dry quickly between uses; is comfortable, lightweight, soft, supple and pliable; and avoids delamination of barrier layers from liner or insulation layers.

This invention is predicated on the discoveries that: moisture from perspiration in any form must absolutely be prevented from entering the insulation of a cold weather or high altitude garment, so that a barrier layer must be impervious to moisture and air and hydrophobic; the inner layer of a cold weather or high altitude garment must not mask the sensation of perspiration, while at the same time it must avoid wetness discomfort; the thin barrier layers in cold weather and/or high altitude garments must be protected from chafing, abrasion and other physical injury resulting from repeated contact with shells, liners, insulation or other layers of the garment; thin barrier layers, such as thin polyurethane film, which are laminated to durable layers on either side thereof, will not undergo any meaningful delamination, and, if the film is stretchable, will not lose their vapor and air impervious character under normal wear for a reasonable life of a garment; and in order to dry quickly, garments must absorb much less moisture than cotton, and must be relatively thin and of an appropriate weave.

According to the present invention, a fabric for use in garments designed for wear in cold temperatures or at high altitudes comprises an inner layer of a thin, quick-drying comfortable fabric, such as silk, polyester tricot or nylon tricot, laminated to a thin, stretchable, non-breathable, vapor and air impermeable, barrier layer, such as hydrophobic polyurethane, which in turn is laminated to an external insulating layer such as fleece or polyfiberfill. The invention may be used in garments such as mittens, triggs, gloves, shirts, vests, jackets, coats, overalls, coveralls, work clothes, hats, socks and boots, and other garments.

The invention achieves all of the aforementioned objects, as is set forth more fully hereinafter.

Other objects, features and advantages of the present invention will become more apparent in the light of the following detailed description of exemplary embodiments thereof, as illustrated in the accompanying drawing.

BRIEF DESCRIPTION OF THE DRAWING

The sole FIGURE herein comprises a partial sectioned side elevation view of a fabric according to the present invention.

BEST MODE FOR CARRYING OUT THE INVENTION

Referring now to the FIGURE, a fabric according to the present invention comprises an inner layer 1 to be worn against the body which comprises a comfortable, lightweight, soft, supple and pliable fabric, such as silk, polyester tricot or nylon tricot. The inner layer 1 is relatively thin and absorbs less moisture from perspiration than would, for instance, cotton, thereby drying quickly from perspiration wetness between uses. A polyester tricot provided by Rentex, Montreal, Canada, is suitable. The layer 1 is laminated to a barrier layer 2 which comprises a thin, pliable, non-porous, stretchable, hydrophobic barrier layer which is impervious to vapor and air, such as polyurethane film. The polyurethane film may, for instance, comprise polyurethane film commercially available under the tradenames SPORTEX or FABUTHANE. An insulation layer 3 comprises a layer of any suitable conventional insulation, and may preferably comprise polyester fleece or polyester fiberfill. The fleece may typically range from six ounces per square yard to 22 ounces per square yard, and may be obtained under the tradename ELITE. The fiberfill may range from two ounces per square yard to eight ounces per square yard, in a range of thickness between about one-quarter inch and about two inches, and may preferably be of a continuous filament construction so as to be more durable and to retain more uniform insulating properties over the life of a garment.

The fiberfill may be those available under the tradenames POLARGUARD or MICROLOFT.

The fabric of the present invention may be made utilizing an adhesive which comprises a water based mixture of acrylic and polyurethane, which may be obtained under the trade designation BASIC ADHESIVE 4782, crossed linked with a catalyst that reacts with the active hydrogen groups found in polyurethane, to enhance the adhesion thereto. One such catalyst can be obtained under the tradename AN-IONAC PFAZ 322, that results in an adhesive which has outstanding chemical and solvent resistance, enhanced abrasion resistance, and good mechanical properties. A garment laminated with such adhesive will sustain more than 100 dry cleaning cycles, and will be washable with due care.

The adhesive is applied to the polyurethane film utilizing a conventional laminating machine employing an engraved roller, such as a conventional 44 TriHelican design. Such a roller provides sufficient adhesive to have a strong lamination bond between the film and the other layers. First, the film 2 with the adhesion 4 applied is joined to the insulation layer 3 and the combination is pressed together through a nip roller. Then the lamination 2–4 is heated at a temperature of between 180° F. and 220° F. for about one minute over a heated drum, thereby to be dried and cured. Then the opposite surface of the film 2 is coated with the same adhesive 5 by the same process and the combination is applied to the inner layer 1, passed through the nip roller, and over the heated drum for drying and curing in the same fashion. The resultant product is a three ply laminated fabric, which is soft, pliable and waterproof.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A fabric for use in garments designed for cold temperatures and high altitudes, comprising:
    an insulation layer;
    a thin, moisture and air impervious, hydrophobic, stretchable barrier layer, a first surface of which is laminated to said insulation layer; and
    an inner layer comprising a thin, comfortable fabric having relatively poor moisture absorption laminated to a second surface of said barrier layer.

2. A fabric according to claim 1 wherein said layers are laminated to each other by means of a water based adhesive cross linked with a hydrogen group reactive catalyst.

3. A fabric according to claim 1 wherein:
    said insulation layer consists of fleece or polyester fiberfill.

4. A fabric according to claim 1 wherein:
    said barrier layer comprises polyurethane.

5. A fabric according to claim 1 wherein:
    said inner layer consists of silk, nylon tricot, or polyester tricot.

6. A fabric for use in garments designed for cold temperatures and high altitudes made by the process comprising:
    (a) preparing an adhesive comprising a mixture of acrylic and polyurethane with a cross linkage catalyst which reacts with active hydrogen groups in polyurethane;
    (b) coating a first side of a thin, moisture and air impervious, hydrophobic, stretchable barrier layer with said adhesive and applying an insulation layer thereto;
    (c) forcing said barrier and insulating layers together through a roller, and heating said resulting lamination to a temperature of between 180° F. and 220° F. for about one minute, to dry and cure the lamination;
    (d) coating the unlaminated side of said barrier layer with said adhesive and applying an inner layer thereto, said inner layer comprising a thin, comfortable fabric having relatively poor moisture absorption; and
    (e) forcing the layers of the resulting three ply lamination together through a roller and heating the three ply lamination to a temperature of between 180° F. and 220° F. for about one minute, to dry and cure the three ply lamination.

7. A fabric according to claim 6 wherein:
    said insulation layer consists of fleece or polyester fiberfill.

8. A fabric according to claim 6 wherein:
    said barrier layer comprises polyurethane.

9. A fabric according to claim 6 wherein:
    said inner layer consists of silk, nylon tricot, or polyester tricot.

10. A fabric according to claim 6 wherein:
    said steps (c) and (e) comprise forcing said layers together through a nip roller.

11. A fabric according to claim 6 wherein:
    said steps (c) and (e) comprise heating said laminations over a heated drum.

* * * * *